United States Patent

Bauer et al.

[11] Patent Number: 5,181,739
[45] Date of Patent: Jan. 26, 1993

[54] SEAT BELT SYSTEM WITH COMFORT CONTROL

[75] Inventors: Barney Bauer, Clarkston; Brian K. Blackburn, Rochester; Scott B. Gentry, Utica, all of Mich.

[73] Assignee: TRW Vehicle Safety Systems Inc., Lyndhurst, Ohio

[21] Appl. No.: 619,124

[22] Filed: Nov. 27, 1990

[51] Int. Cl.⁵ .............................................. B60R 22/44
[52] U.S. Cl. ................................. 280/807; 73/862.39; 73/862.391; 242/107
[58] Field of Search ............... 280/807, 806, 808, 801; 242/107, 107.6, 107.7, 107.4 R; 297/483, 475; 73/862.39, 862.64

[56] References Cited

U.S. PATENT DOCUMENTS

| | | | |
|---|---|---|---|
| 2,905,231 | 9/1959 | Olson | 280/807 |
| 2,984,103 | 5/1961 | Decker | 73/862.39 |
| 3,880,364 | 4/1975 | Andres | 242/107.4 R |
| 4,570,872 | 2/1986 | Tsujimura | 242/107 |
| 4,616,850 | 10/1986 | Sedlmayr | 280/808 |
| 4,630,841 | 12/1986 | Nishimura et al. | |
| 4,659,108 | 4/1987 | Sack | 280/808 |
| 4,854,522 | 8/1989 | Brown et al. | |

FOREIGN PATENT DOCUMENTS 1756657 4/1970 Fed. Rep. of Germany ...... 280/807
1130749 12/1984 U.S.S.R. ......................... 73/862.626

Primary Examiner—Karin L. Tyson
Attorney, Agent, or Firm—Tarolli, Sundheim & Covell

[57] ABSTRACT

A rotatable spool has seat belt webbing wound around the spool. A motor, when actuated, rotates the spool in the belt withdrawal direction. A spring has a biasing force which rotates the spool to wind the belt webbing onto the spool. A worm gear mechanism is located between the motor and the spool and is selectively drivingly connectable with the spool. When drivingly connected with the spool, the worm gear mechanism prevents the biasing force of the spring from winding the belt webbing onto the spool. A clutch, when engaged, connects the spool and the worm gear mechanism. The clutch is disengaged and the motor is deactuated when a belt tension signal is below a lower predetermined threshold value. The clutch is engaged and the motor is actuated when the belt tension signal is above an upper predetermined threshold value which is greater than the lower predetermined threshold value. The clutch is engaged and the motor is deactuated when the belt tension signal is between the upper and lower predetermined threshold values. A pressure sensor provides the belt tension signal which continuously varies in magnitude as the amount of tension in the belt webbing continuously varies.

4 Claims, 2 Drawing Sheets

SEAT BELT SYSTEM WITH COMFORT CONTROL

BACKGROUND OF THE INVENTION

1. Technical Field

The present invention relates to a vehicle seat belt system, and particularly relates to a seat belt system constructed to minimize belt tension acting on an occupant of a vehicle during non-emergency conditions.

2. Background Art

Vehicle seat belt systems which minimize belt tension acting on an occupant are well known. One such seat belt system is shown in U.S. Pat. No. 4,630,841. The seat belt system of U.S. Pat. No. 4,630,841 includes a number of detection switches for detecting the tension in seat belt webbing buckled around a vehicle occupant. These switches control a motor which in turn controls the biasing force of a spiral spring acting on a take-up shaft to wind up the belt webbing. By controlling the biasing force of the spiral spring, the belt tension acting on the occupant can be controlled.

Another known vehicle seat belt system is shown in U.S. Pat. No. 4,659,108. This seat belt system includes a slack sensor switch which changes between two states depending on whether there is slack in a seat belt or not. The system further includes a motor controlled in response to the state of the slack sensor switch. After the seat belt is buckled around a vehicle occupant, the motor rotates in a direction so as to tighten the seat belt against the occupant and then rotates in the reverse direction so as to pay out some seat belt to provide some slack in the seat belt. As a result, belt tension does not act on the occupant.

Also, there are numerous vehicle seat belt retractor designs which include a comfort mechanism. Typically, a comfort mechanism includes a first member fixed to a retractor spool on which belt webbing is wound. The spool and the first member are biased in a belt retraction direction by a belt rewind spring. A second member selectively blocks rotation of the first member and the retractor spool in the belt retraction direction. When rotation of the first member and the retractor spool is blocked, the biasing force of the belt rewind spring does not act through the belt webbing against the occupant. U.S. Pat. No. 4,854,522 discloses an example of such a seat belt retractor.

SUMMARY OF THE INVENTION

In accordance with the present invention, a seat belt system includes a seat belt retractor. The retractor comprises a rotatable spool with belt webbing wound around the spool. The spool is rotatable in a belt withdrawal direction and in a belt retraction direction. A motor, when actuated, rotates the spool in the belt withdrawal direction. A spring biases the spool in the belt retraction direction.

The biasing force of the spring acting through the belt webbing against the vehicle occupant can cause discomfort to the occupant. Therefore, the seat belt system of the present invention has a means for, when enabled, selectively blocking the biasing force of the spring from acting through the belt webbing against the occupant. When the belt webbing is around the occupant, the means is enabled and the biasing force of the spring does not act through the belt webbing against the occupant.

The occupant may move around in the vehicle seat and lean forward from an initial seated position. When this occurs, the motor may actuate to pay out belt webbing. As the occupant moves back to the initial seated position, the means for blocking the biasing force of the spring from acting is disabled so that the biasing force of the spring can wind up belt webbing onto the spool. After the occupant is back in the initial seated position, the means for blocking the biasing force of the spring from acting is again enabled so that the biasing force of the spring does not act through the belt webbing against the occupant.

In the present invention, the means for blocking the biasing force of the spring from acting through the belt webbing against the occupant is a mechanism for selectively preventing rotation of the spool in the belt retraction direction. The mechanism is located between the motor and the spool and is drivingly connected to the motor. A clutch is located between the mechanism and the spool and, when engaged, drivingly connects the mechanism with the spool. When the mechanism is drivingly connected with the spool, it prevents the biasing force of the spring from winding belt webbing onto the spool.

The clutch is disengaged when tension in the belt webbing is below a lower predetermined threshold value. Disengaging the clutch allows the spring to wind up the belt webbing onto the spool. Thus, the clutch is disengaged when the belt webbing is unbuckled from around the occupant. The clutch is also disengaged when slack in the belt webbing is created, for example, by the occupant returning to an initial seated position after having leaned forward from the initial seated position.

The clutch is engaged when tension in the belt webbing is above the lower predetermined threshold value. When the clutch is engaged and drivingly connects the mechanism with the spool, the mechanism prevents the biasing force of the spring from acting to wind belt webbing onto the spool. Thus, the belt tension does not act against the occupant.

In the event that the tension in the belt webbing increases substantially above the lower predetermined threshold value to an upper predetermined threshold value, the motor is energized to pay out belt webbing. If the occupant leans forward and increases the tension in the belt webbing, for example, the motor is energized and belt webbing is paid out. The occupant thus need not move against the biasing force of the spring.

The seat belt system of the present invention includes a belt tension sensor which provides a continuously variable signal indicating the amount of tension in the belt webbing. The belt tension sensor is located in a belt turning loop assembly which has an opening through which the belt webbing is directed. The belt tension sensor is preferably a pressure sensing means. The pressure sensing means provides a signal having a magnitude which continuously varies as the amount of tension in the belt webbing continuously varies.

The tension signal is directed to a controller which controls the motor and clutch. The controller controls actuation of the motor and the clutch in response to the magnitude of the tension signal from the belt tension sensor. If the tension signal indicates that the belt tension is below the lower predetermined threshold value and a predetermined amount of belt webbing has been withdrawn from the spool, the clutch is disengaged and the motor is deactuated. If the belt tension goes above the lower predetermined threshold value, the clutch is engaged and the motor remains deactuated. If the belt tension goes above the upper predetermined threshold value, the clutch is engaged and the motor is actuated. In the event of a vehicle collision, a deceleration sensing switch signals the controller to disable the motor to prevent payout of belt webbing from the spool even though tension in the belt webbing increases.

BRIEF DESCRIPTION OF THE DRAWINGS

The foregoing and other features and advantages of the present invention will become apparent to one skilled in the art to which the present invention relates from reading the following description of a preferred embodiment of the present invention in conjunction with the accompanying drawings, in which.

DESCRIPTION OF A PREFERRED EMBODIMENT OF THE INVENTION

Figure 1:
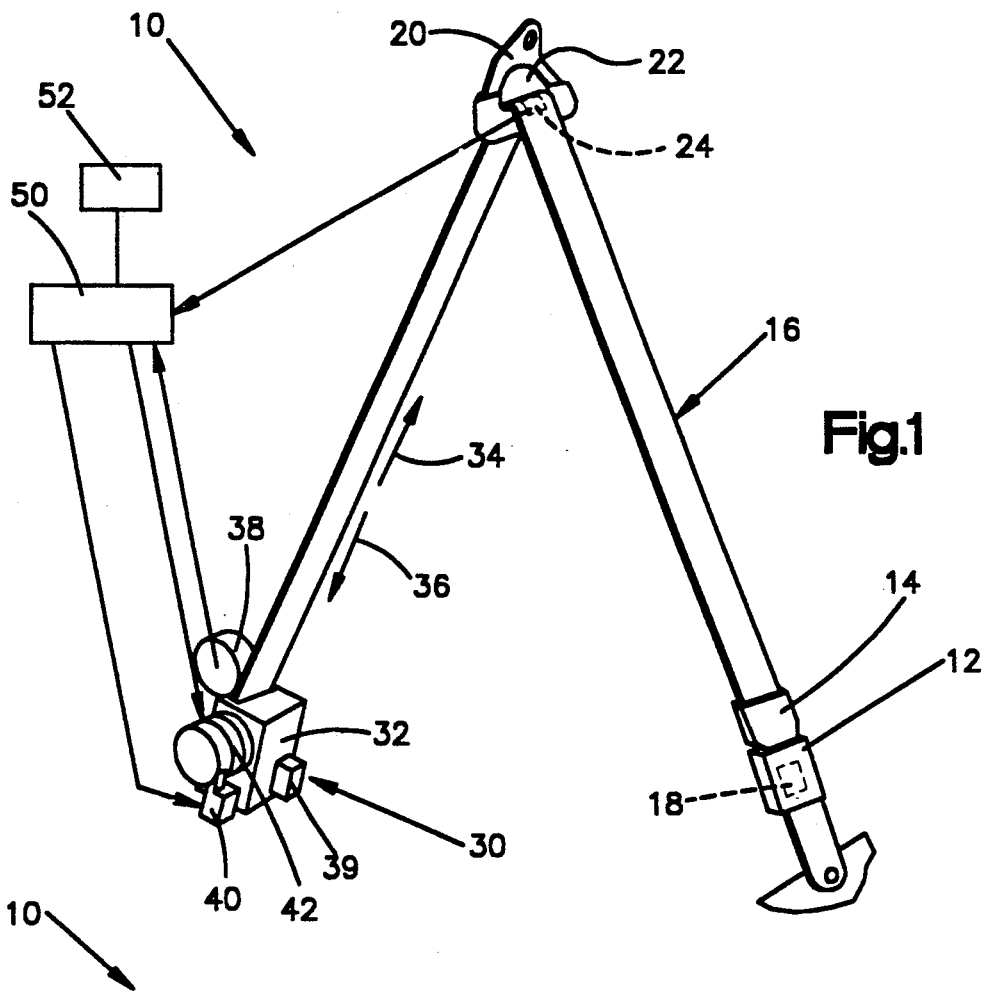
FIG. 1 is a perspective view illustrating a seat belt system which is constructed in accordance with the present invention.

As representative of the present invention, FIG. 1 illustrates a seat belt system 10 for a vehicle. The seat belt system 10 includes a buckle assembly 12 secured to a portion of the vehicle. A tongue assembly 14 is connected to belt webbing 16 and has a portion which is insertable into the buckle assembly 12.

When the tongue assembly 14 is inserted into the buckle assembly 12, the tongue assembly 14 is latched to the buckle assembly 12. The belt webbing 16 is herein referred to as being "buckled" when the tongue portion of the tongue assembly 14 is inserted into and latched to the buckle assembly 12. An actuatable buckle switch 18 is mounted in the buckle assembly 12. When the tongue assembly 14 is latched to the buckle assembly 12, the buckle switch 18 is actuated to provide a first signal indicative of this buckled condition.

The seat belt system 10 further includes a belt turning loop assembly 20 (D-ring) secured to another portion of the vehicle. The belt turning loop assembly 20 has a generally D-shaped opening 22 through which the belt webbing 16 is guided. A solid-state pressure sensor 24 is disposed on the belt turning loop assembly 20. The sensor 24 is located between a flat portion 11 (FIG. 4) of the belt turning loop assembly 20 in the vicinity of the D-shaped opening 22 and a rib 21 extending across the D-shaped opening 22.

Figure 3:
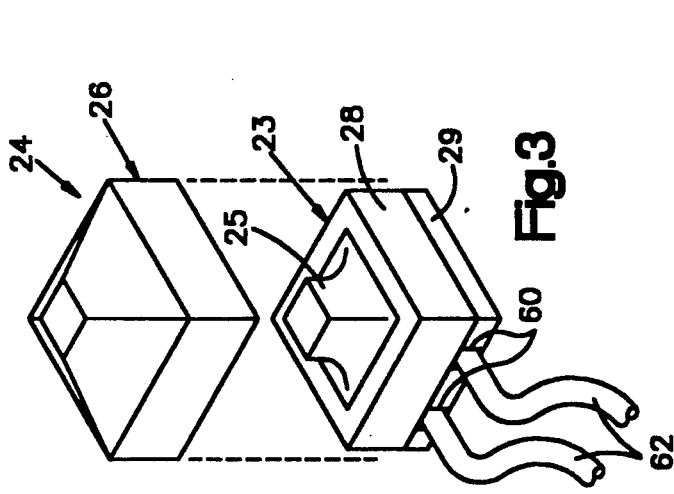
FIG. 3 is a perspective view illustrating a pressure sensor used in the seat belt system of FIG. 1.

Referring to FIG. 3, the pressure sensor 24 includes a flexible protective cover 26 under which a pressure sensitive chip 23 is located. The pressure sensitive chip 23 is disposed within a case having an upper portion 28 and a lower portion 29. The pressure sensitive chip 23 further includes a column portion 25 projecting through the upper portion 28 of the case into the cover 26. The lower portion 29 has electrical head inserts 60 into which electrical wires 62 are inserted.

When tension is applied to the belt webbing 16, the belt webbing 16 presses against the rib 21 extending across the D-shaped opening 22. The rib 21, in turn, presses against the cover 26. The pressure on the cover 26 acts against the column portion 25 of the pressure sensitive chip 23. When pressure acts against the column portion 25 of the chip 23, the chip 23 responds by providing an electrical signal on one of the electrical wires 62. The signal is indicative of the amount of pressure acting on the cover 26 against the column portion 25. The amount of pressure acting against the column portion 25 is, in turn, related to the amount of tension in the belt webbing 16. The electrical signal has a magnitude which continuously varies as the amount of tension in the belt webbing 16 continuously varies. The pressure sensor 24 thus provides a second signal which has a magnitude which continuously varies as the amount of tension in the belt webbing 16 continuously varies.

Figure 4:
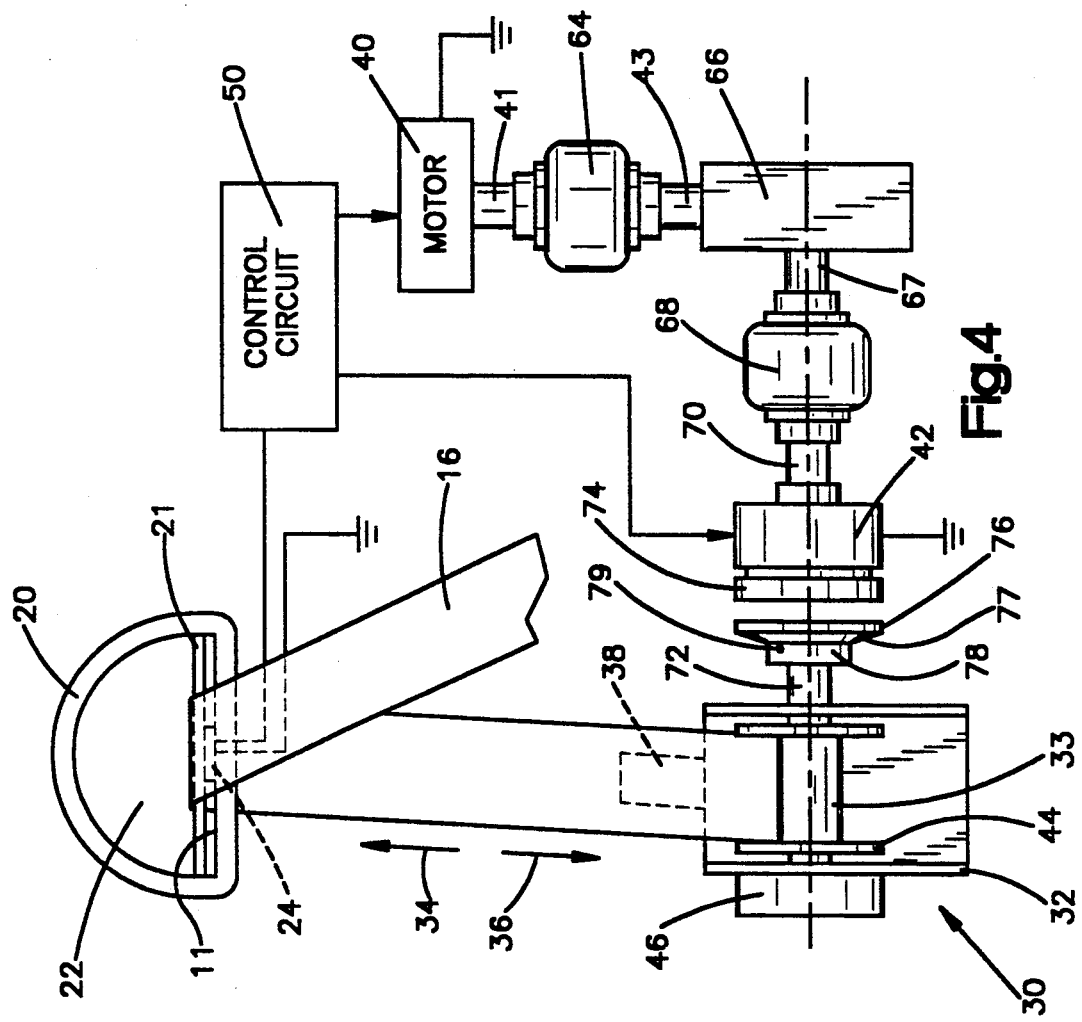
FIG. 4 is a schematic view of a portion of the seat belt system of FIG. 1.

The seat belt system 10 (FIGS. 1 and 2) further includes a seat belt retractor 30. Referring to FIG. 4, the retractor 30 includes a frame and a seat belt spool 44. The spool 44 has a take-up shaft 33 supported at its ends by the frame 32 for rotation about its longitudinal central axis. The frame 32 of the retractor 30 is secured to another portion of the vehicle.

The belt webbing 16 is wound around the spool 44 and the take-up shaft 33. The belt webbing 16 is movable in a belt withdrawal direction 34 or in a belt retraction direction 36, and the spool 44 rotates in a corresponding direction. A return spring 46 is operatively connected between the take-up shaft 33 and the frame 32 of the retractor 30. The return spring 46 biases the take-up shaft 33 in a direction so as to rotate the spool 44 in a direction to wind the belt webbing 16 onto the spool 44. Therefore, the return spring 46 biases the belt webbing 16 in the belt retraction direction 36.

A belt sensing switch 38 is located in the vicinity of the retractor 30. The belt sensing switch 38 is of conventional design and manufacture and is therefore not described in detail herein. When a predetermined minimum amount of belt webbing has been withdrawn from the retractor 30, the belt sensing switch 38 provides a third signal indicative of such withdrawal. A vehicle deceleration sensing switch 39 (FIG. 2) is mounted on the vehicle. The deceleration switch 39 is of conventional design and manufacture and is therefore not described in detail herein. When the deceleration sensing switch 39 senses vehicle deceleration at a rate at least equal to a predetermined rate, such as during a vehicle collision, the switch 39 provides a signal indicative of such condition.

Figure 5:
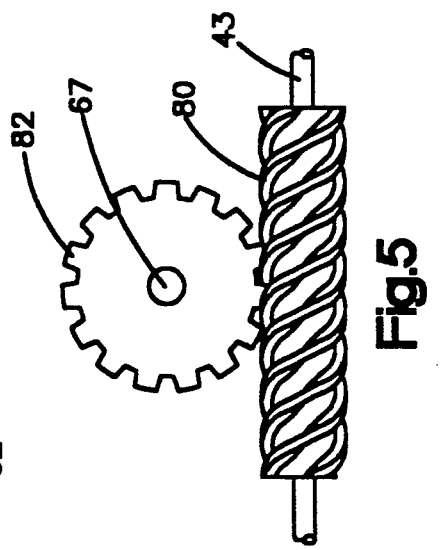
FIG. 5 is a schematic view illustrating a worm gear mechanism used in the seat belt system of FIG. 1.

An electric motor 40 has an output shaft 41 drivingly connected through a flexible coupling 64 and a shaft portion 43 to a worm gear mechanism 66 shown in FIG. 5. The worm gear mechanism 66 includes a worm 80 and a worm wheel 82 in meshing engagement with the worm 80. The worm 80 is connected through the shaft portion 43 and the flexible coupling 64 to the output shaft 41 of the motor 40. The worm wheel 82 is connected through a shaft portion 67 and another flexible coupling 68 to a driving shaft 70 of a clutch 42.

Preferably, the worm gear mechanism 66 has a gear reduction of 20 to 1. Also, the helix angle of the worm 80 is preferably less than five degrees, and the pressure angle of the worm 80 engaging with the worm wheel 82 is preferably greater than fifteen degrees. The meshing engagement of the worm 80 and the worm wheel 82 prevents the worm wheel 82 from rotating in the belt retraction direction 36 and driving the worm 80, as is known. Thus, when the clutch 42 is engaged, the take-up shaft 33 is prevented from rotating in the belt retraction direction 36.

Each of the flexible couplings 64, 68 is an elastomeric drive coupling made of high durometer rubber bonded between metal discs which are keyed to the adjacent shafts. The flexible coupling 64 accommodates misalignment between the output shaft 41 of the motor 40 and the shaft portion 43. The coupling 64 also helps cushion the shock of the clutch 42 engaging and disengaging. The flexible coupling 68 accommodates misalignment between the driving shaft 70 of the clutch 42 and the shaft portion 67. The coupling 68 also helps cushion the shock of the clutch 42 engaging and disengaging.

The clutch 42 is an electromagnetic clutch. It has a driving plate 74 connected to the driving shaft 70 of the clutch 42. A driven plate 76 is coupled through a plurality of leaf springs 77 to a hub 78 fixed to a driven shaft 72 of the clutch 42. The driven shaft 72 is drivingly connected to the take-up shaft 33 of the spool 44. A set screw 79 is associated with the hub 78 for tightening the hub 78 against the driven shaft 72. The driven plate 76 is axially movable relative to the driving plate 74. When the clutch 42 is disengaged there is an air gap between the driven plate 76 and the driving plate 74. The driven plate 76 moves into contact with the driving plate 74 when the clutch 42 is engaged.

Figure 2:
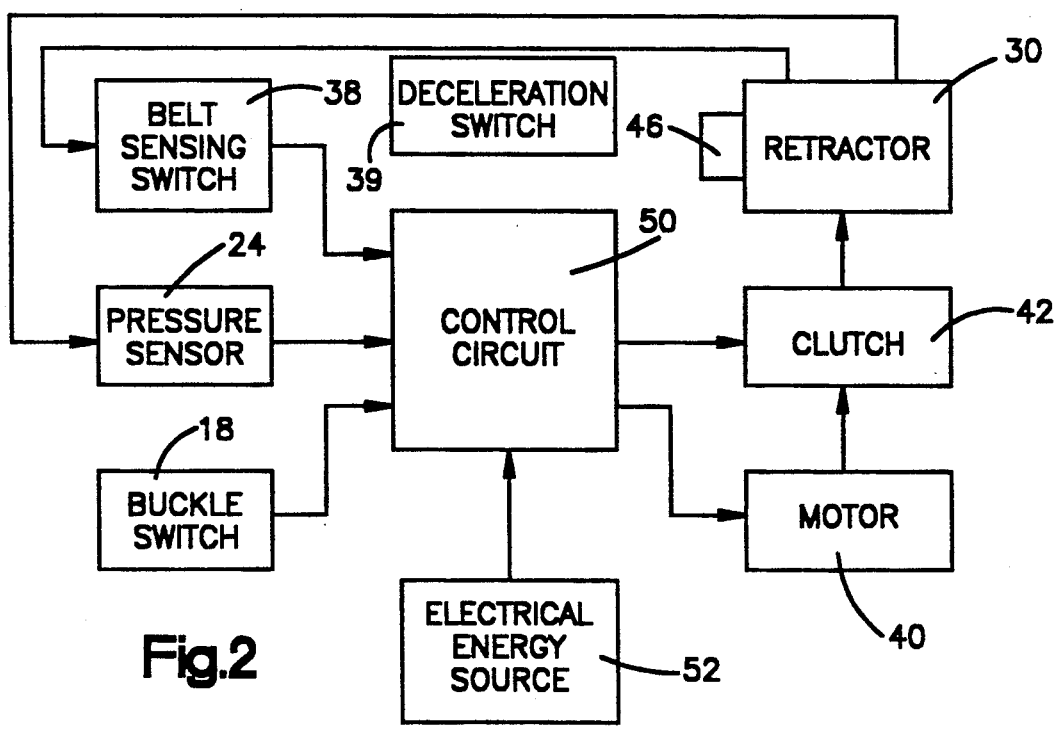
FIG. 2 is a schematic block diagram illustrating the control system for the seat belt system of FIG. 1.

When the output shaft 41 of the motor 40 rotates and the clutch 42 is engaged, the take-up shaft 33 rotates in a direction to rotate the spool 44 in the belt withdrawal direction 34. Thus, the motor 40 and the clutch 42 cooperate to rotate the spool 44 in the belt withdrawal direction 34. The motor 40 is actuated in response to a first output signal provided by an activatable control circuit 50 (FIG. 2). The clutch 42 is engaged and disengaged in response to a second output signal provided by the control circuit 50.

The control circuit 50 preferably includes a microcomputer. Referring to FIG. 2, the control circuit 50 is connected to a source of electrical energy 52 such as a vehicle battery. The control circuit 50 receives the first signal from the buckle switch 18, the second signal from the pressure sensor 24, and the third signal from the belt sensing switch 38. The control circuit 50 provides the first output signal to control the motor 40 and the second output signal to control the clutch 42 in response to the signals from the buckle switch 18, the pressure sensor 24 and the belt sensing switch 38.

Before the occupant initially withdraws the belt webbing 16 from the retractor 30 to buckle it, the first signal from the buckle switch 18 indicates that the tongue assembly 14 is not latched to the buckle assembly 12, the second signal from the pressure sensor 24 indicates that the tension in the belt webbing 16 is below a predetermined lower threshold, and the third signal from the belt sensing switch 38 indicates that a certain minimum amount of belt webbing is not unwound from the spool 44 of the retractor 30. The clutch 42 is not engaged, and the motor 40 is not actuated.

When the occupant initially withdraws the webbing 16 to buckle the webbing 16, the second signal from the pressure sensor 24 increases to indicate an increasing tension in the belt webbing 16. After the tongue assembly 14 is latched to the buckle assembly 12, the first signal from the buckle switch 18 changes to a value indicating that the tongue assembly 14 is latched to the buckle assembly 12. The second signal from the pressure sensor 24 continues to provide the second signal to indicate the amount of tension in the belt webbing 16. The third signal from the belt sensing switch 38 now indicates that the minimum amount of belt webbing has been withdrawn from the spool 44 of the retractor 30.

The control circuit 50 is activated when the first signal from the buckle switch 18 indicates that the tongue assembly 14 is latched to the buckle assembly 12 and the third signal from the belt sensing switch 38 indicates that the minimum amount of belt webbing has been withdrawn from the spool 44 of the retractor 30. When the control circuit 50 is activated, the control circuit 50 monitors the second signal from the pressure sensor 24 indicative of the amount of tension in the belt webbing 16.

After the belt webbing 16 has been buckled around the occupant and the belt webbing 16 has been released, the spring 46 winds any slack in the belt webbing 16 around the spool 44. The tension in the belt webbing 16 thus increases. When the amount of tension in the belt webbing 16 increases above the lower predetermined threshold value, the clutch 42 engages, but the motor 40 remains deactuated.

With the motor 40 deactuated and the clutch 42 engaged, the worm gear mechanism 66 blocks the biasing force of the return spring 46 from acting on the spool 44 to wind the belt webbing 16 onto the spool 44. Because the biasing force of the return spring 46 is blocked from acting on the spool 44, the biasing force does not act through the belt webbing 16 against the occupant to cause discomfort for the occupant. Thus, the biasing force of the return spring 46 does not act through the belt webbing 16 against the occupant when the amount of tension in the belt webbing 16 increases above the lower predetermined threshold value. The clutch 42 remains engaged and the motor 40 remains deactuated so long as the occupant remains in the normally-seated position and the belt webbing 16 remains buckled.

While the belt webbing 16 is buckled, the occupant may lean forward from the normally-seated position to a forward position. Such movement will increase the belt tension. The amount of tension in the belt webbing 16 may increase above an upper predetermined threshold value which is greater than the lower predetermined threshold value. If this occurs, the control circuit 50 maintains the clutch 42 engaged and actuates the motor 40 to drive the spool 44 in a direction so as to pay out belt webbing. The tension in the belt webbing 16 decreases as belt webbing is being paid out. When the amount of tension in the belt webbing 16 decreases below the upper predetermined threshold value, the motor 40 is deactuated and the clutch 42 remains engaged. The motor 40 remains deactuated and the clutch 42 remains engaged so long as the occupant remains in the forward position and the belt webbing 16 remains buckled.

Excess slack may form in the belt webbing 16 when the occupant returns from the forward to the normally-seated position. The slack means that the tension in the belt webbing 16 decreases when the occupant returns to the normally-seated position. When the tension in the belt webbing 16 decreases below the lower predetermined threshold value, the clutch 42 disengages and the motor 40 remains deactuated. When the clutch 42 is disengaged, the biasing force of the return spring 46 acts on the spool 44 to wind the belt webbing 16 onto the spool 44.

The biasing force of the return spring 46 continues to wind the belt webbing 16 onto the spool 44 until the amount of tension in the belt webbing 16 increases above the lower predetermined threshold value. When the amount of tension in the belt webbing 16 is above the lower predetermined threshold value and below the upper predetermined threshold value, the clutch 42 is engaged and the motor 40 is deactuated. As already described hereinabove, the biasing force of the return spring 46 does not act through the belt webbing 16 against the occupant when the clutch 42 is engaged and the motor 40 is deactuated. Thus, after the occupant returns from the forward position to the normally-seated position, the biasing force of the return spring 46 does not act through the belt webbing 16 against the occupant to cause discomfort for the occupant.

When the occupant unbuckles the belt webbing 16, the clutch 42 is disengaged and the motor 40 is deactuated. The spring 46 then winds the belt webbing 16 onto the spool 44. Also, when the ignition of the vehicle is turned off, the clutch 42 is disengaged and the motor 40 is deactuated.

In the event of a vehicle collision, tension in the belt webbing 16 increases. At the same time, the deceleration sensing switch 39 provides a signal indicative of the occurrence of the vehicle collision to the control circuit 50. In response to the signal from the deceleration sensing switch 39, the control circuit 50 disables the motor 40. By disabling the motor 40, payout of belt webbing from the spool 44 of the retractor 30 is prevented as tension in the belt webbing 16 increases during the vehicle collision. The retractor 30 has a mechanism, such as a known pendulum-type locking mechanism, for locking the spool 44 in position and thereby preventing the belt webbing 16 from withdrawing from the spool in the event of a vehicle collision.

It will be appreciated that the pressures being sensed at the belt turning loop assembly 20 are relatively low. The low pressures sensed at the belt turning loop assembly 20 are the reason for including the buckle switch 18 in the system 10. In the absence of the buckle switch 18, the weight of the tongue assembly 14 might be sufficient to cause the sensor to generate a signal to engage the clutch 42 and actuate the motor 40. Belt webbing would then be paid out, resulting in improper operation of the seat belt system 10. By using the buckle switch 18 in the seat belt system 10, the clutch 42 cannot engage and the motor 40 cannot actuate to pay out belt webbing unless the buckle switch 18 provides the signal indicative of the belt webbing 16 being buckled.

From the above description of a preferred embodiment of the present invention, those skilled in the art will perceive improvements, changes and modifications. For example, although the preferred embodiment of the invention is illustrated as part of a two-point shoulder belt system, the invention could also be used in a continuous loop, three-point shoulder and lap belt system. Such improvements, changes and modifications within the skill of the art are intended to be covered by the appended claims.

Having described the invention, the following is claimed:

1. An apparatus comprising:
   a rotatable spool with vehicle seat belt webbing wound around said spool, said spool being rotatable in a belt withdrawal direction and in a belt retraction direction;
   a motor for rotating said spool in the belt withdrawal direction to pay out belt webbing from said spool;
   a spring for rotating said spool in the belt retraction direction to wind belt webbing onto said spool;
   means for selectively drivingly connecting said motor and said spool for, when drivingly connecting said motor and spool, preventing the biasing force of said spring from winding the belt webbing onto said spool, said means including (i) drive means for preventing the biasing force of said spring from winding the belt webbing onto said spool and (ii) an engageable clutch for, when engaged, drivingly connecting said spool and said drive means to prevent the biasing force of said spring from winding the belt webbing onto said spool; and
   pressure sensing means for sensing the amount of tension in the belt webbing and providing a signal having a magnitude which continuously varies as the amount of tension in the belt webbing continuously varies;
   said clutch being disengaged when the magnitude of said signal is below a first predetermined threshold value and being engaged when the magnitude of said signal is above said first predetermined threshold value;
   said motor being (a) actuated to rotate said spool in the belt withdrawal direction to pay out belt webbing from said spool when the magnitude of said signal is above a second predetermined threshold value which is greater than said first predetermined threshold value and (b) deactuated when the magnitude of said signal is below said second predetermined threshold value.

2. The apparatus of claim 1 wherein said motor is deactuated and said clutch is engaged so that said drive means prevents the biasing force of said spring from winding the belt webbing onto said spool when the magnitude of said signal is between said first and second predetermined threshold values.

3. An apparatus comprising:
   a rotatable spool with vehicle seat belt webbing wound around said spool, said spool being rotatable in a belt withdrawal direction and in a belt retraction direction, said spool being rotatable in the belt withdrawal direction to enable the belt webbing to be buckled around a vehicle occupant, said spool being rotatable in the belt retraction direction to enable the belt webbing to be drawn against the occupant;
   a motor for rotating said spool in the belt withdrawal direction to pay out belt webbing from said spool;
   a spring for rotating said spool in the belt retraction direction to wind the belt webbing onto said spool;
   an engageable clutch for, when engaged, drivingly connecting said motor and said spool and, when disengaged, disconnecting said motor from said spool;
   drive means connected between said clutch and said motor for, when said clutch is engaged, acting on said spool to prevent the biasing force of said spring from winding the belt webbing onto said spool;
   pressure sensing means for sensing the amount of tension in the belt webbing and providing a signal having a magnitude which continuously varies as the amount of tension in the belt webbing continuously varies; and
   control means for disengaging said clutch when the magnitude of said signal is below a first predetermined threshold value and engaging said clutch when the magnitude of said signal is above said first predetermined threshold value, said control means actuating said motor to rotate said spool in the belt withdrawal direction to pay out belt webbing from said spool when the magnitude of said signal is above a second predetermined threshold value which is grater than said first predetermined threshold value and deactuating said motor when the magnitude of said signal is below said second predetermined threshold value.

4. The apparatus of claim 3 wherein said motor is deactuated and said clutch is engaged so that said drive means prevents the biasing force of said spring from winding the belt webbing onto said spool when the magnitude of said signal is between said first and second predetermined threshold values.

* * * * *